United States Patent
Hsu (10) Patent No.: US 9,444,999 B2
(45) Date of Patent: Sep. 13, 2016

(54) FEATURE DETECTION IN IMAGE CAPTURE

(71) Applicant: OMNIVISION TECHNOLOGIES, INC., Santa Clara, CA (US)

(72) Inventor: Ming-Kai Hsu, Fremont, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 14/452,377

(22) Filed: Aug. 5, 2014

(65) Prior Publication Data

US 2016/0044237 A1 Feb. 11, 2016

(51) Int. Cl.
*H04N 5/228* (2006.01)
*G06K 9/46* (2006.01)
*H04N 5/232* (2006.01)
*G06K 9/00* (2006.01)
*G06K 9/62* (2006.01)

(52) U.S. Cl.
CPC ...... *H04N 5/23219* (2013.01); *G06K 9/00241* (2013.01); *G06K 9/00248* (2013.01); *G06K 9/00281* (2013.01); *G06K 9/00308* (2013.01); *G06K 9/6206* (2013.01); *G06K 9/6276* (2013.01); *H04N 5/23222* (2013.01)

(58) Field of Classification Search
CPC ............. G06K 9/629; G06K 9/00241; G06K 9/00248; G06K 9/00281; G06K 9/00308; G06K 9/6206; G06K 9/6276; G06T 7/0042; H04N 5/23219; H04N 5/23222
See application file for complete search history.

(56) References Cited

U.S. PATENT DOCUMENTS

| 6,118,887 A * | 9/2000 | Cosatto ............. G06K 9/00228 382/103 |
|---|---|---|
| 7,039,222 B2 | 5/2006 | Simon et al. |
| 8,274,581 B2 | 9/2012 | Su et al. |
| 8,374,442 B2 | 2/2013 | Yu et al. |
| 8,380,004 B1 | 2/2013 | Moffat |
| 8,437,516 B2 | 5/2013 | Song et al. |
| 8,805,018 B2 | 8/2014 | Li et al. |
| 2003/0223623 A1 | 12/2003 | Gutta et al. |
| 2008/0310731 A1* | 12/2008 | Stojancic ........... G06K 9/00711 382/195 |
| 2010/0111489 A1 | 5/2010 | Presler |
| 2011/0052081 A1* | 3/2011 | Onoe ................. G06K 9/00268 382/203 |

(Continued)

FOREIGN PATENT DOCUMENTS

| CN | 101860680 A | 10/2010 |
|---|---|---|
| CN | 102385691 A | 3/2012 |

(Continued)

OTHER PUBLICATIONS

TW Patent Application No. 102139395—Taiwanese Office Action and Search Report, mailed Jul. 20, 2015, with English Translation, 14 pages.

(Continued)

*Primary Examiner* — Aung S Moe
*Assistant Examiner* — John H Morehead, III
(74) *Attorney, Agent, or Firm* — Blakely Sokoloff Taylor & Zafman LLP (57) ABSTRACT

A feature detection process includes identifying an approximate location of a feature in a preliminary image. A gradient phase map of image pixel intensities within the approximate location is computed. A projection result is determined by applying a projection function to the gradient phase map. The projection result is analyzed to determine a state of the feature.

17 Claims, 5 Drawing Sheets

(56) References Cited

U.S. PATENT DOCUMENTS

| | | | |
|---|---|---|---|
| 2011/0211073 | A1 | 9/2011 | Foster |
| 2011/0310237 | A1 | 12/2011 | Wang et al. |
| 2012/0070041 | A1 | 3/2012 | Wang |
| 2012/0114198 | A1 | 5/2012 | Yang et al. |
| 2012/0288166 | A1 | 11/2012 | Sun et al. |
| 2012/0288167 | A1 | 11/2012 | Sun et al. |
| 2012/0321140 | A1* | 12/2012 | Xiong .......... G06K 9/00228 382/108 |
| 2012/0328202 | A1 | 12/2012 | Tian et al. |
| 2013/0142426 | A1* | 6/2013 | Kaneda .......... G06K 9/4642 382/165 |
| 2014/0050372 | A1 | 2/2014 | Qi et al. |
| 2014/0063236 | A1* | 3/2014 | Shreve .......... G06K 9/00228 348/143 |
| 2014/0105487 | A1* | 4/2014 | Irie .......... G06K 9/00281 382/159 |

FOREIGN PATENT DOCUMENTS

| | | |
|---|---|---|
| CN | 103077537 A | 5/2013 |
| TW | 200416622 A | 9/2004 |
| TW | 201013545 A | 4/2010 |
| TW | 201039251 A | 11/2010 |
| TW | 201220214 A | 5/2012 |
| TW | 201227541 A | 7/2012 |
| TW | 201305923 A | 2/2013 |

OTHER PUBLICATIONS

J.-F. Aujol et al., "Image Decomposition into a Bounded Variation Component and an Oscillating Component," Journal of Mathematical Imaging and Vision, 22 (2005), Springer Science & Business Media, Inc., Netherlands, pp. 71-88.

P. C. Mahalanobis, "On the generalised distance in statistics," *Proceedings of the National Institute of Sciences of India*, vol. 2, No. 1 (1936), Calcutta, India, pp. 49-55.

Z. Wang et al., "Image Quality Assessment: From Error Visibility to Structural Similarity," *IEEE Transactions on Image Processing*, vol. 13, No. 4, Apr. 2004, pp. 1-14.

U.S. Appl. No. 13/946,299, filed Jul. 19, 2013, Hsu.

Z. Wang et al., "Translation Insensitive Image Similarity in Complex Wavelet Domain," Presented at: ICASSP-05, Philadelphia, PA, Mar. 19-23, 2005, *Proc. IEEE International Conference on Acoustics, Speech & Signal Processing*, vol. II, pp. 573-576, Mar. 2005.

E. A. Silva et al., "Quantifying image similarity using measure of enhancement by entropy," In *Mobile Multimedia/Image Processing for Military and Security Applications*, vol. 6579 of Presented at the Society of Photo-Optical Instrumentation Engineers (SPIE) Conference, San Jose, CA, USA, Apr. 2007, 12 pages.

M. Pedersen et al., "Survey of full-reference image quality metrics," Høgskolen i Gjøviks rapportserie, 2009 nr. 5, The Norwegian Color Research Laboratory (Gjøvik University College), Jun. 2009, 74 pages. ISSN: 1890-520X.

U.S. Appl. No. 13/946,299—Final Office Action, mailed Apr. 8, 2016, 21 pages.

Wright et al., Robust Face Recognition via Sparse Representation, 2009, IEEE Transactions on Pattern Analysis and Machine Intelligence, vol. 31, No. 2, pp. 1-18.

Huang et al., (Face Recognition Based on Collaborative Image Similarity Assessment, 2012, 2012 International Conference on Information Security and Intelligence Control, pp. 254-257.

U.S. Appl. No. 13/946,299—Non-Final Office Action, mailed Oct. 9, 2015, 25 pages.

TW 102139395—Second Office Action with English Translation, issued Dec. 16, 2015, 8 pages.

TW Patent Application No. 103136358—Taiwanese Office Action and Search Report, issued Aug. 28, 2015, with English Translation (6 pages).

\* cited by examiner

Equation 903 — Integral Projection Function ("IPF") — Equation 905

$$IPF_v(j) = \frac{1}{m}\sum_{i=1}^{m}\psi(i,j) \quad IPF_h(i) = \frac{1}{n}\sum_{j=1}^{n}\psi(i,j)$$

Equation 907 — Variance Projection Function ("VPF") — Equation 909

$$VPF_v(j) = \frac{1}{m}\sum_{i=1}^{m}(\psi(i,j) - IPF_v(j)) \quad VPF_h(i) = \frac{1}{n}\sum_{j=1}^{n}(\psi(i,j) - IPF_h(i))$$

Entropy Equation: — Equation 911

$$H(S) = -\sum_{i=1}^{k} P(x_i)\log_2 P(x_i)$$

$P(x_i)$: probability of pixel intensity in gradient phase map $k$: pixel number

FEATURE DETECTION IN IMAGE CAPTURE

TECHNICAL FIELD

This disclosure relates generally to image capture, and in particular but not exclusively, relates to detecting features in images.

BACKGROUND INFORMATION

Image sensors have become ubiquitous. They are widely used in digital still cameras, cellular phones, security cameras, as well as, medical, automobile, and other applications. The technology used to manufacture image sensors, has continued to advance at great pace.

One feature that is useful in connection with image sensors is feature detection. For example, some devices that include image sensors are capable of capturing an image in response to detecting a given feature in an image. For example, an image may be captured in response to detecting that a person in the image frame is smiling. Conventionally, classifiers of features from training images requiring significant storage space have been loaded into memory to be used to compare with a current image that an image sensor is currently imaging. To accommodate the variety in size, shape, and shades that features (e.g. mouths and teeth) include, a large number of classifiers of features from training images may be required to sufficiently identify a smile, for example. Furthermore, additional training images are necessary to identify additional features (e.g. eyes for blink detection). Therefore, feature detection takes significant memory resources.

In addition to memory resources, the conventional feature detection also requires significant processing resources to compare the current image to the variety of classifiers of features from training images. This may cause time delays in capturing the desired images and drain battery resources. Hence, a feature detection device and/or method that would reduce memory, processing, and/or power consumption would be desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for detecting states of features in images for facial recognition are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Figure 1:
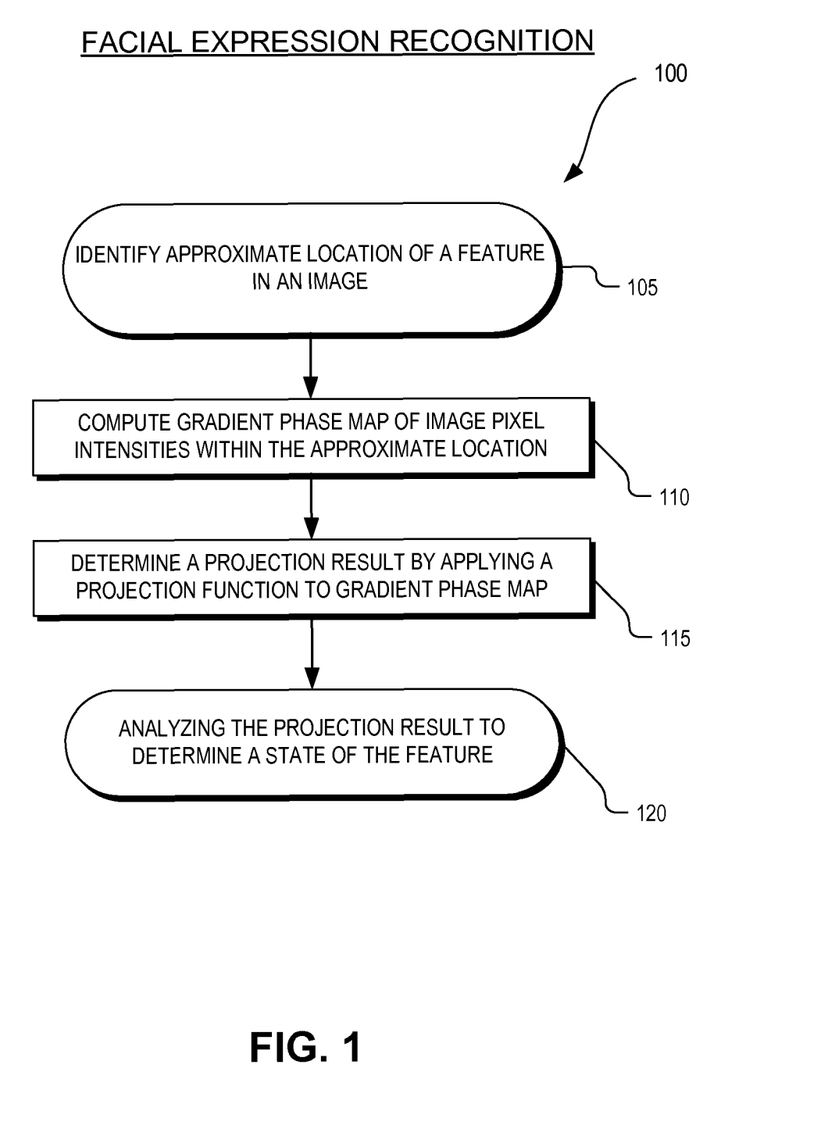
FIG. 1 illustrates a flowchart showing an example process of facial expression recognition, in accordance with an embodiment of the disclosure.

FIG. 1 illustrates a flowchart showing an example process 100 of facial expression recognition, in accordance with an embodiment of the disclosure. The order in which some or all of the process blocks appear in process 100 should not be deemed limiting. Rather, one of ordinary skill in the art having the benefit of the present disclosure will understand that some of the process blocks may be executed in a variety of orders not illustrated, or even in parallel.

Process 100 may be executed by processing circuitry within a camera with a digital image sensor or may be executed on processing circuitry integrated into an image sensor. The processing circuitry may include a processor, a Field Programmable Gate Array ("FPGA"), a Digital Signal Processor ("DSP"), or otherwise. The processing circuitry may include memory to store settings, images, and image data received from the image sensor. In the context of utilizing process 100 with an image sensor, the image sensor may be constantly capturing preliminary digital images for evaluation prior to capturing a permanent digital image to be saved indefinitely. In one embodiment, when the image sensor is capturing preliminary digital images, those initial digital images are evaluated for certain features (e.g. eyes, nose, mouth, wrinkles).

Figure 2:
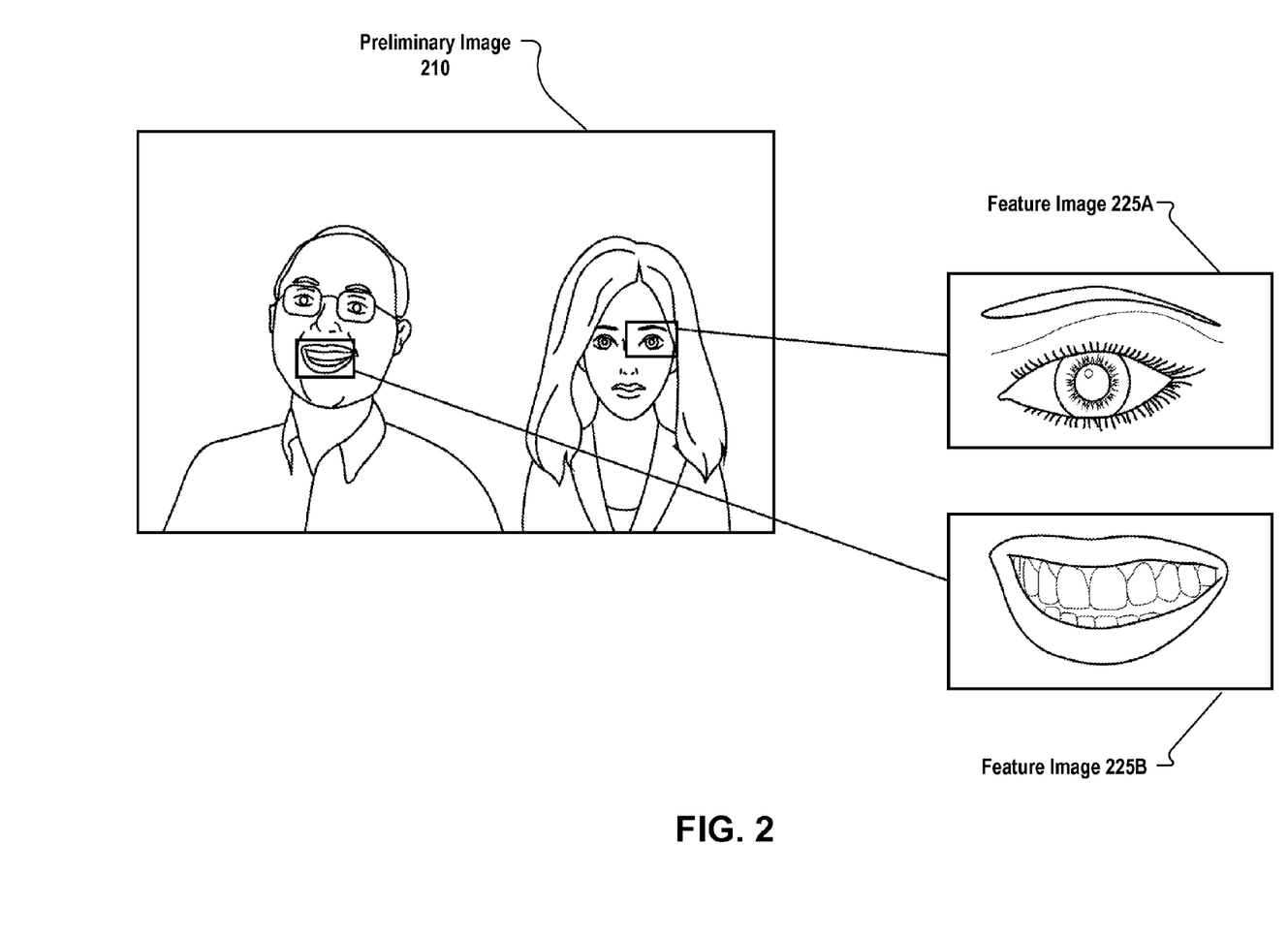
FIG. 2 shows a preliminary image of a scene that includes two people, in accordance with an embodiment of the disclosure.

In process block 105, an approximate location of a feature in an image is identified. FIG. 2 shows a preliminary image 210 of a scene that includes two people, in accordance with an embodiment of the disclosure. If a blink detection mode of the camera or image sensor is selected, the feature to be identified may be an eye. If a smile detection mode of the camera or image sensor is selected, the feature to be identified may be a mouth. The modes of the camera may be selected by a user interface (e.g. dial or touch screen) coupled to the processing circuitry of the camera. To identify a feature in preliminary image 210, a variety of identification processes can be used. For example, a feature can be identified by shape, size, entropy analysis, projection functions, or by learning algorithms that employ learning images.

As an example, distance ratios between an upper eye and lower eye lid or distances between an upper lip and a lower lip can be utilized to determine an approximate location of an eye or a mouth. Shape algorithms that match shapes such as the shape of a mouth or an eye can also be utilized to determine an approximate location of an eye or a mouth. The distance ratios may be combined with shape algorithms to identify the approximate location of the feature as well.

Entropy analysis to identify approximate locations of a feature includes applying an initial entropy analysis to pixel intensities of the image. In one embodiment, identifying approximate locations of a feature includes applying a projection function to pixel intensities of the image.

Learning algorithms use training images to determine an approximate location of a feature. Learning images contain mouths, eyes, and other features that may be leveraged to better capture a permanent image. In learning algorithms, the learning images may be compared with regions of the preliminary image to identify similar features. For example, image processing that includes comparing a learning image of an eye to preliminary image 210 may identify an eye in preliminary image 210. After identifying an eye in preliminary image 210, the approximate location of the eye can be identified and preliminary image 210 may be cropped to yield feature image 225A. Similarly, image processing that includes comparing a learning image of a mouth to preliminary image 210 may identify a mouth in preliminary image 210. After identifying a mouth in preliminary image 210, the approximate location of the mouth can be identified and preliminary image 210 may be cropped to yield feature image 225B.

Returning to FIG. 1, a gradient phase map of image pixel intensities within the approximate location is computed in process block 110. The computation may be made by processing circuitry coupled to the image sensor that captured preliminary image 210. When feature image 225A or 225B is representative of the approximate location, a gradient phase map of the image pixel intensities is computed on the feature image 225. For the purposes of this disclosure, computing a gradient phase map is defined as assigning each pixel a gradient that represents the direction of the steepest pixel intensity change according to surrounding/neighboring pixels. Gradient is described as an angle (degrees). Therefore, a white pixel (having the greatest intensity value) that is next to a black pixel (having the smallest intensity value) would be assigned an angle of a vector that points from the white pixel to the black pixel.

Figure 3:
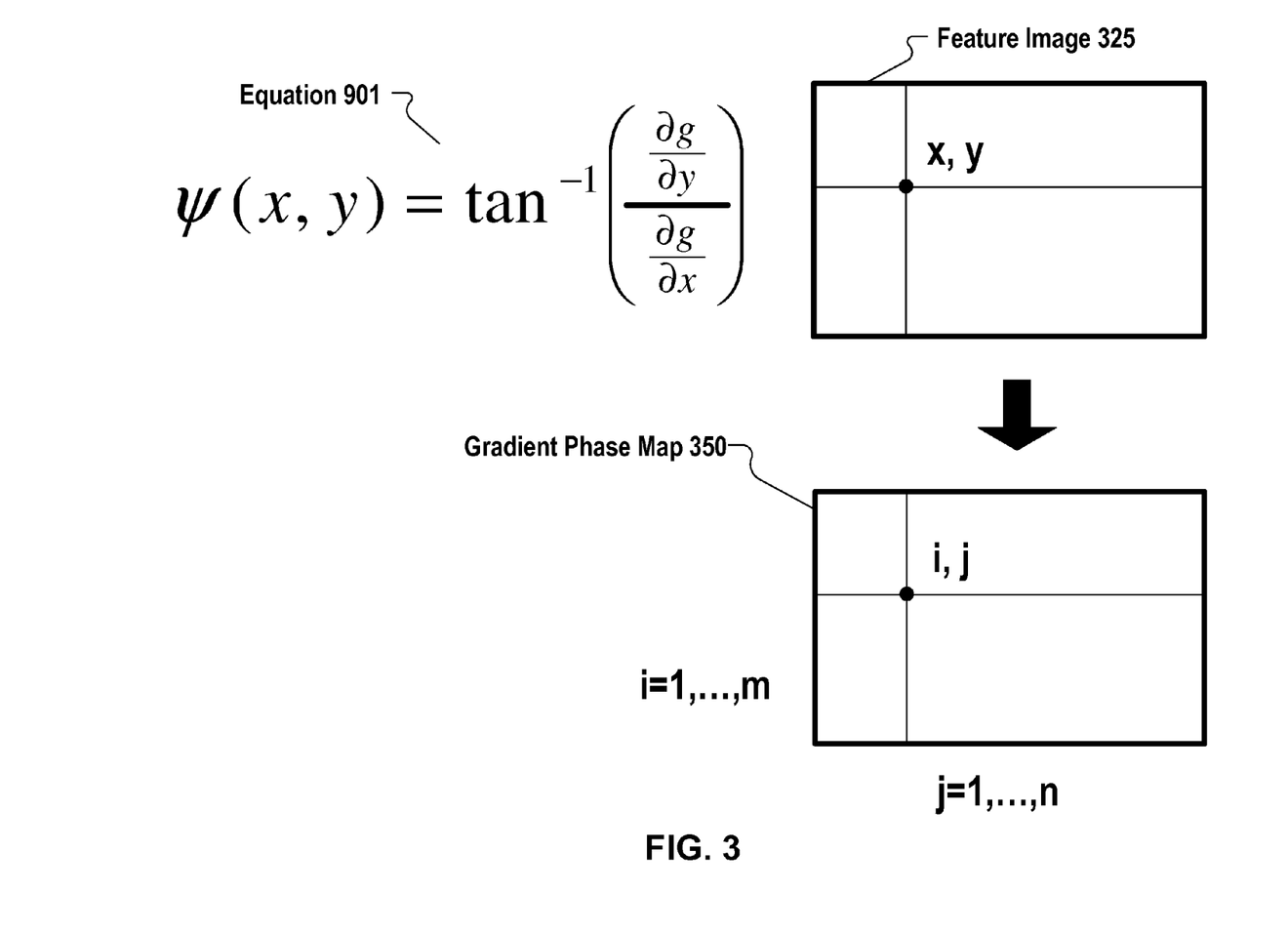
FIG. 3 illustrates generating a gradient phase map using an example feature image, in accordance with an embodiment of the disclosure.

FIG. 3 illustrates generating a gradient phase map 350 using an example feature image 325, in accordance with an embodiment of the disclosure. To generate gradient phase map 350, the gradient phase angle ($\psi$) of each pixel in feature image 325 is calculated using equation 901, where $\psi$ is the direction of the gradient at point (x, y).

Once the gradient phase map is generated in process block 115 in FIG. 1, a projection function is applied to the gradient phase map (e.g. gradient phase map 350) to determine a projection result in process block 115. The projection function may be applied to the gradient phase map using the prior mentioned processing circuitry. In one embodiment, an Integral Projection Function ("IPF") is applied to the gradient phase map 350 to determine the mean phase of the pixels in the gradient phase map. In another embodiment, a Variance Projection Function ("VPF") is applied to the gradient phase map 350 to determine a deviation between the pixels and the average phase of the pixels in the gradient phase map.

Figure 4:
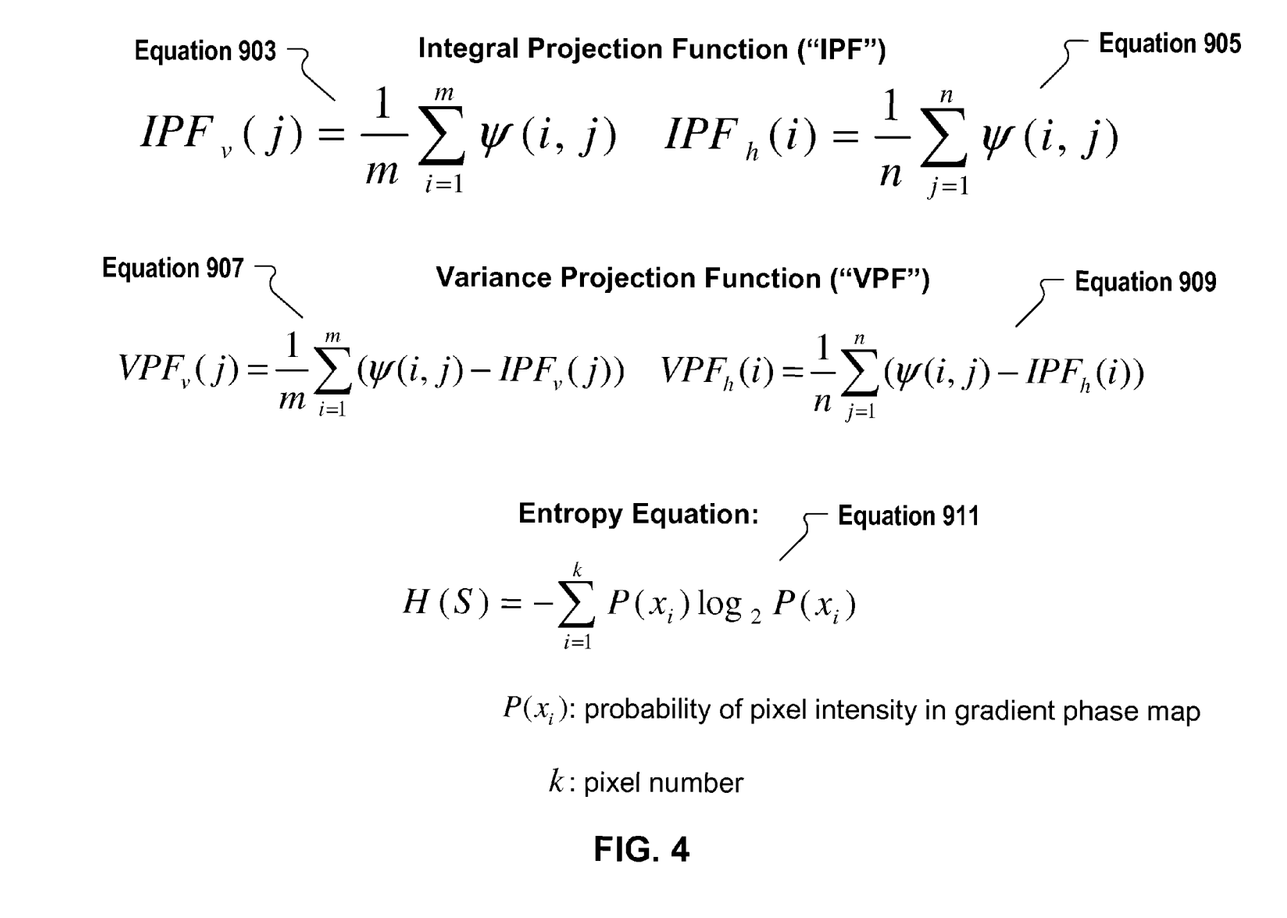
FIG. 4 illustrates example projection function equations and an entropy equation that can be utilized in accordance with embodiments of the disclosure.

FIG. 4 illustrates example projection function equations and an entropy equation that can be utilized in accordance with embodiments of the disclosure. To get the projection result, Equations 903 and 905 are applied to gradient phase map 350 when an IPF is deployed as the projection function, whereas equations 907 and 909 are applied to gradient phase map 350 when a VPF is deployed as the projection function. Note that deploying VPF as the projection function involves first applying Equations 903 and 905, as the result of those equations is in Equations 907 and 909.

Figure 5:
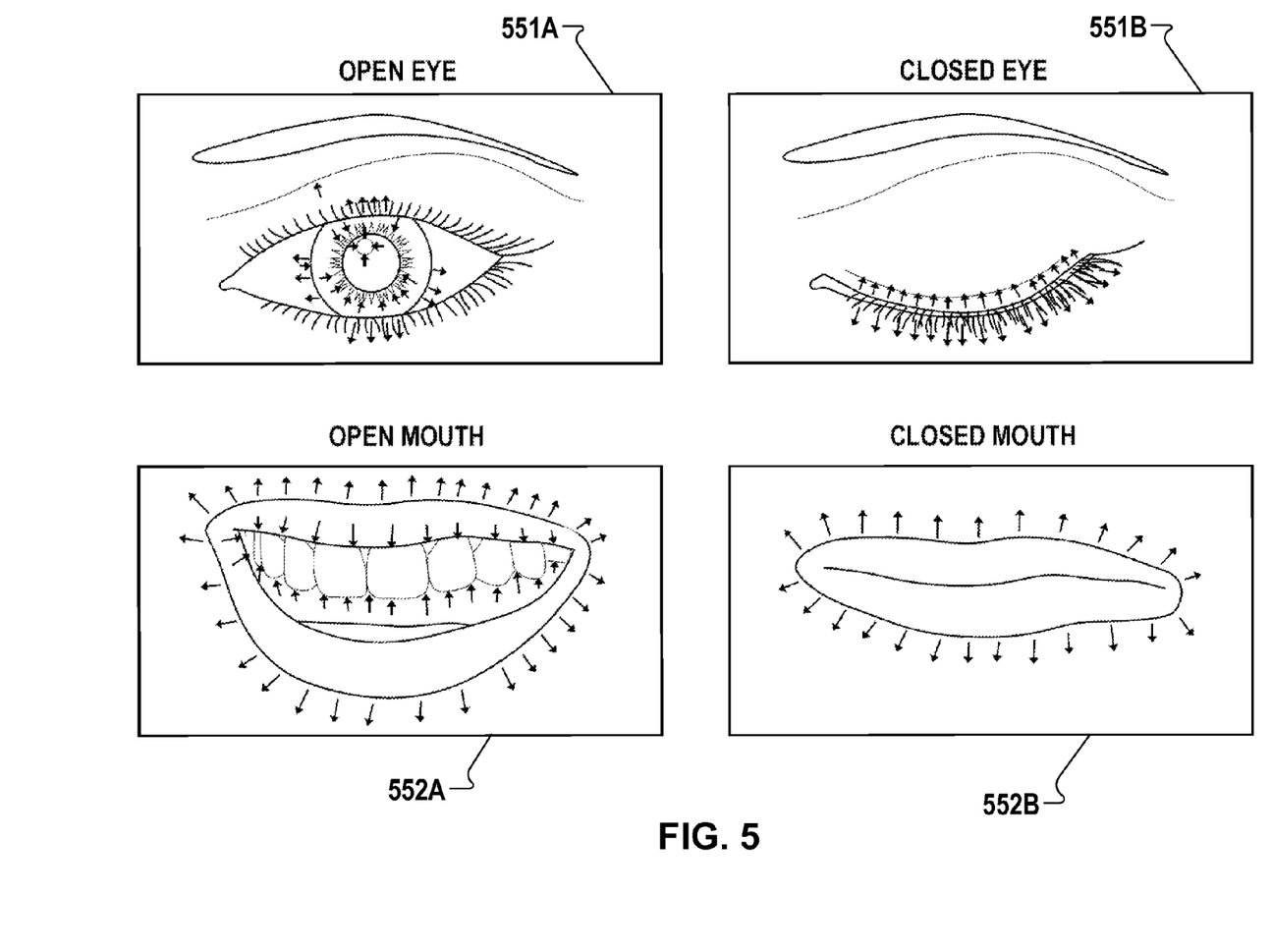
FIG. 5 illustrates gradient phase maps of example feature images in accordance with embodiments of the disclosure.

In process block 120 of FIG. 1, the projection result is analyzed to determine a state of the feature. The projection result of applying the projection function is a statistical result that can be further analyzed to determine a state of feature. For example, a given projection result may indicate a mouth is smiling or an eye is open. To further illustrate, FIG. 5 illustrates gradient phase maps of example feature images in accordance with embodiments of the disclosure. More specifically, FIG. 5 shows gradient phase map 551A showing an open eye, gradient phase map 551B showing a closed eye, gradient phase map 552A showing an open mouth, and gradient phase map 552B showing a closed mouth.

Applying a projection function (e.g. IPF or VPF) to gradient phase map 551A will yield a different projection result than applying a projection function to gradient phase map 551B. Gradient phase maps 551A, 551B, 552A, and 552B include gradient arrows that indicate the angle assigned to a given pixel. Convention is to designate gradients from white to black, although the example gradient arrows in FIG. 5 use a black to white convention (the arrows point from darker pixels to lighter pixels). For example, the gradient arrows point from the darker pixels of the eye lashes to the lighter pixels of the eyelid in gradient phase map 551B. Similarly, the gradient arrows point from the darker pixels of the mouth to the lighter pixels of the teeth in gradient phase map 552A.

As FIG. 5 shows, a state of a feature (e.g. eyes closed or open, mouth smiling or closed) will yield different projection results because of the difference in how the gradient arrows (representing the gradient phase of pixels) are pointed. These projections results are simply a number (statistical result) that can be analyzed to determine a state of the feature. In one embodiment, the projection result of a closed eye is 55-125 degrees, and the projection result of an open eye is 0-55 degrees or 125-180 degrees. Similar boundaries can be established for the projection result of closed mouths versus smiling mouths to aid in analyzing the projection result. With numerical projection results, analyzing the projection result to determine a state of the feature requires decreased processing resources when compared to conventional processes to determine a state of a feature.

As mentioned previously, FIG. 4 includes an Entropy equation, equation 911. Entropy is the measure of disorder in a system. Specifically in the context of the disclosure, entropy equation 911 is the measure of disorder in a gradient phase map (e.g. gradient phase map 350), where $p(x_i)$ is the probability of pixel intensity in a gradient phase map, and k is the pixel number. Performing entropy analysis on a gradient phase map will yield an entropy result. Optionally, an entropy analysis can be performed on the gradient phase map in addition to applying the projection function to yield a projection result. The entropy result can be analyzed to aid in determining the state of the feature. For example, a gradient phase map of a closed eye has less entropy than a gradient phase map of an open eye and the entropy result can be analyzed as another data point to confirm the determination of the state of the feature made by analyzing the projection result.

Once the state of the feature is determined in process block 120, an action may be initiated in response to the determination. For example, if the feature is a mouth and the state of the mouth is open (smiling), the action initiated may be initiating an image capture by an image sensor. The processing circuitry that determines the state of the feature may send instructions to the image sensor to capture the image. Similarly, if the feature is an eye and the state of the eye is open, the image capture may be initiated in response to determining that the eye is open (rather than being closed).

One potential advantage of the disclosed method is to reduce computation cost and processing resources used to detect a facial expression. In addition, the detection of the facial expression may be quicker than conventional methods, which reduces lag in capturing a desired image. Furthermore, the need for having arrays of training images stored in memory is decreased.

The disclosed method may also increase the reliability of facial recognition compared to the conventional methods. Since conventional methods rely on training images, features that are slightly different from the training image in shape, size, or shade may generate error in analysis. In comparison, the slight differences in shape, size, or shade of a feature may not significantly affect the gradient phase map of an image, and therefore the disclosed method is less prone to error.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A machine implemented method, the method comprising:
    identifying an approximate location of a feature in a preliminary image that was captured by an image sensor;
    computing, using processing circuitry coupled to the image sensor, a gradient phase map of image pixel intensities within the approximate location, wherein the gradient phase map assigns each pixel a gradient phase angle which is the direction of the gradient at the pixel, and wherein the direction of the gradient shows the direction of the largest pixel intensity change with respect to surrounding pixels;
    determining a projection result by applying a projection function to the gradient phase map, wherein the projection function includes an integral projection function, comprising:
        a vertical integral projection function ("$IPF_v$") including a mean of each pixel's gradient phase angle in the approximate location, for each column of the approximate location in a vertical direction; and
        a horizontal integral projection function ("$IPF_h$") including a mean of each pixel's gradient phase angle in the approximate location, for each row of the approximate location in a horizontal direction; and
    analyzing the projection result to determine a state of the feature.

2. The machine implemented method of claim 1 further comprising:
    initiating an action in a camera in response to the state of the feature.

3. The machine implemented method of claim 2, wherein the action is initiating an image capture by the image sensor to capture a permanent image.

4. The machine implemented method of claim 1 further comprising:
    determining an entropy result by performing an entropy analysis of the gradient phase map to include, within the approximate location, a negative of the sum of a product of a probability of the pixel intensity for each pixel in the gradient phase map and a logarithm of the probability; and
    analyzing the entropy result to determine the state of the feature.

5. The machine implemented method of claim 1, wherein the projection function is a variance projection function (VPF) that sums deviations between each point in the gradient phase map and an average phase in the gradient phase map, wherein the VPF includes:
    a vertical variance projection function (VPFv) for each column to include a mean of a difference of each pixel's gradient phase angle and the IPFv of each column in the approximate location; and
    a horizontal variance projection function (VPFh) for each row to include a mean of the difference of each pixel's gradient phase angle and the IPFh of each row in the approximate location.

6. The machine implemented method of claim 1, wherein the feature is an eye and the state of the eye is either open or closed.

7. The machine implemented method of claim 1, wherein the feature is a mouth and the state of the mouth is either smiling or not smiling.

8. The machine implemented method of claim 1, wherein said identifying the approximate location of the feature includes applying an initial entropy analysis to pixel intensities of the preliminary image.

9. The machine implemented method of claim 1, wherein said identifying the approximate location of the feature includes applying a projection function to pixel intensities of the preliminary image.

10. The machine implemented method of claim 1, wherein said identifying the approximate location of the feature includes comparing the preliminary image with training images that include various features.

11. A non-transitory machine-accessible storage medium that provides instructions that, when executed by a machine, will cause the machine to perform operations comprising:
   identifying an approximate location of a feature in a preliminary image captured by an image sensor;
   computing, using processing circuitry coupled to the image sensor, a gradient phase map of image pixel intensities within the approximate location, wherein the gradient phase map assigns each pixel a gradient phase angle which is the direction of the gradient at the pixel, and wherein the direction of the gradient shows the direction of the largest pixel intensity change with respect to surrounding pixels;
   determining a projection result by applying a projection function to the gradient phase map, wherein the projection function includes an integral projection function, comprising:
      a vertical integral projection function ("$IPF_v$") including a mean of each pixel's gradient phase angle in the approximate location, for each column of the approximate location in a vertical direction; and
      a horizontal integral projection function ("$IPF_h$") including a mean of each pixel's gradient phase angle in the approximate location, for each row of the approximate location in a horizontal direction; and
   analyzing the projection result to determine a state of the feature.

12. The non-transitory machine-accessible storage medium of claim 11, further providing instructions that, when executed by the machine, will cause the machine to perform further operations, comprising:
   initiating an action in a camera in response to the state of the feature.

13. The non-transitory machine-accessible storage medium of claim 12, wherein the action is initiating an image capture by the image sensor to capture a permanent image.

14. The non-transitory machine-accessible storage medium of claim 11, further providing instructions that, when executed by the machine, will cause the machine to perform further operations, comprising:
   determining an entropy result by performing an entropy analysis of the gradient phase map; and
   analyzing the entropy result to determine the state of the feature.

15. The non-transitory machine-accessible storage medium of claim 11, wherein the projection function is a variance projection function that sums deviations between each point in the gradient phase map and an average phase in the gradient phase map.

16. The non-transitory machine-accessible storage medium of claim 11, wherein the feature is an eye and the state of the eye is either open or closed.

17. The non-transitory machine-accessible storage medium of claim 11, wherein the feature is a mouth and the state of the mouth is either smiling or not smiling.

* * * * *